United States Patent
Aiteanu

(10) Patent No.: US 12,511,985 B2
(45) Date of Patent: Dec. 30, 2025

(54) DETERMINING THE DROWSINESS OF A PERSON ON THE BASIS OF A BLINKING ANALYSIS

(71) Applicant: Bayerische Motoren Werke Aktiengesellschaft, Munich (DE)

(72) Inventor: Dorin Aiteanu, Berg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 78 days.

(21) Appl. No.: 18/558,968

(22) PCT Filed: Apr. 6, 2022

(86) PCT No.: PCT/EP2022/059100
§ 371 (c)(1),
(2) Date: Nov. 3, 2023

(87) PCT Pub. No.: WO2022/233527
PCT Pub. Date: Nov. 10, 2022

(65) Prior Publication Data
US 2024/0378977 A1    Nov. 14, 2024

(30) Foreign Application Priority Data
May 4, 2021  (DE) .................. 10 2021 111 465.9

(51) Int. Cl.
*G08B 21/06* (2006.01)
*G06V 20/59* (2022.01)
(52) U.S. Cl.
CPC ........... *G08B 21/06* (2013.01); *G06V 20/597* (2022.01)

(58) Field of Classification Search
CPC .............................. G08B 21/06; G06V 20/597
See application file for complete search history.

(56) References Cited

U.S. PATENT DOCUMENTS

| 8,879,790 B2 | 11/2014 | Akiyama |
| 10,278,619 B2 | 5/2019 | Wulf et al. |

(Continued)

FOREIGN PATENT DOCUMENTS

| CN | 104269028 A | 1/2015 |
| DE | 296 07 558 U1 | 8/1996 |

(Continued)

OTHER PUBLICATIONS

International Search Report (PCT/ISA/210) issued in PCT Application No. PCT/EP2022/059100 dated Jul. 28, 2022 (2 pages).

(Continued)

*Primary Examiner* — Daryl C Pope
(74) *Attorney, Agent, or Firm* — Crowell & Moring LLP

(57) ABSTRACT

The invention relates to a method for determining the drowsiness of a driver of a motor vehicle. An average eye-opening measure of an open eye of the driver is determined. The eye-opening measure corresponds to a distance between an upper and a lower eyelid of the eye. A lower limit value and an upper limit value are also determined. The lower and upper limit values each correspond to an eye-opening measure less than the determined average maximum eye-opening measure. An average duration of an opening process of the eye of the driver is determined. The eye-opening measure is between the lower and upper limit values during the opening process. The drowsiness of the driver is determined on the basis of the determined average duration of the opening process.

7 Claims, 2 Drawing Sheets

(56) References Cited

U.S. PATENT DOCUMENTS

| | | | |
|---|---|---|---|
| 2008/0218359 A1* | 9/2008 | Ishida | G06V 40/171 |
| | | | 340/575 |
| 2008/0238694 A1 | 10/2008 | Ishida | |
| 2014/0205149 A1 | 7/2014 | Nakamura et al. | |
| 2014/0210625 A1* | 7/2014 | Nemat-Nasser | G08B 21/06 |
| | | | 340/575 |
| 2017/0091955 A1* | 3/2017 | Nakai | H04N 23/611 |
| 2017/0119248 A1 | 5/2017 | Morgan et al. | |
| 2018/0247141 A1 | 8/2018 | Mori | |

FOREIGN PATENT DOCUMENTS

| | | |
|---|---|---|
| DE | 100 24 227 A1 | 12/2001 |
| DE | 10 2007 054 310 A1 | 5/2009 |
| DE | 10 2011 108 305 A1 | 3/2012 |
| DE | 11 2010 005 290 T5 | 12/2012 |
| DE | 10 2017 202 659 A1 | 8/2018 |
| EP | 3 310 248 B1 | 4/2018 |
| WO | WO 2018/149519 A1 | 8/2018 |

OTHER PUBLICATIONS

German Search Report issued in German Application No. 10 2021 111 465.9 dated Apr. 27, 2022, with partial English translation (8 pages).

* cited by examiner

DETERMINING THE DROWSINESS OF A PERSON ON THE BASIS OF A BLINKING ANALYSIS

This application is a 371 of International Application No. PCT/EP2022/059100, filed Apr. 6, 2022 which claims priority under 35 U.S.C. § 119 from German Patent Application No. 10 2021 111 465.9, filed May 4, 2021, the entire disclosure of which is herein expressly incorporated by reference.

BACKGROUND AND SUMMARY

The present invention relates to a method for determining the drowsiness of a driver of a motor vehicle and a control unit designed to carry out the method.

The drowsiness of a motor vehicle driver, in particular a driver of an automobile, can typically be determined visually or non-visually. Nonvisual approaches comprise, for example, a determination of the drowsiness on the basis of an analysis of steering movements of the motor vehicle driver, as described in DE 10 2011 108 305 A1. However, determining the drowsiness on the basis of the steering movements is very inaccurate for a significant fraction of the drivers.

Visual approaches in particular comprise detecting and analyzing an eye status, for example whether the eyes are open or closed, and/or a pupil diameter, as described in WO 18149519 A1. Visual approaches usually use a video-based device for detecting and analyzing the eye status, which includes a camera system oriented toward the motor vehicle driver and an image processing unit for high-frequency determination of the eye status of the driver. The visual approaches are based here on the assumption that a blinking frequency is greater in drowsy motor vehicle drivers and a blink occupies a longer time span than in the case of non-drowsy motor vehicle drivers.

The prior art for determining the drowsiness from the eye status analysis includes applications of the PERCLOS algorithm, as described, for example, in DE 29607558 U1 and CN 104269028 A, in which the time of the eye closure is summed over a specific time interval and calculated as a percentage (for example, the eyes of the driver were closed in 16% of the measurements in the last 300 seconds). The determined percentage values correlate with specific drowsiness levels (for example, 0-10% awake, 10-25% sleepy, etc.).

However, the PERCLOS algorithm, like the determination of drowsiness on the basis of the steering movements, has significant inaccuracy, since it is not possible to distinguish accurately by simply summing the eye closure times between drowsy drivers who have a low blinking frequency and non-drowsy drivers who execute a blink generally or acutely at higher frequency (for example, in the case of a blinding effect due to the sun or the oncoming traffic).

Alternatively, the drowsiness can be determined on the basis of the blinking frequency, as described in DE 10 2007 054 310 A1, or the blinking activity, as described in DE 11 2010 005 290 T5 and DE 10024227 A1. This is based on the observation that the speed of closing the eyes during a blink inversely correlates with the drowsiness level.

The approaches based on the blinking frequency analysis also do not have sufficient accuracy of the drowsiness detection, since in many drowsy drivers, only the increase of the duration of the blink and not in addition the blinking frequency is observed. The analysis of the blinking speed fails with different ethnic groups, who generally have smaller normal eye openings (for example in the case of Asiatic drivers), or due to a blinding effect by the sun or the oncoming traffic in all drivers.

A further known method is based on the analysis of the pupil diameter, as described in DE 10 2017 202 659 A1. In the approach based on the analysis of the pupil diameter, there is the added disadvantage that both drowsy and also non-drowsy drivers have different pupil diameters during the day, at night, and in the event of a blinding effect, which hardly correlate with the drowsiness level.

Against the background of this prior art, the object of the present invention is to specify a device and a method which are each capable of overcoming at least the above-mentioned disadvantages of the prior art. The object is accordingly achieved by a method for determining the drowsiness of a driver of a motor vehicle. The method can also be designated as a method for determining the drowsiness of a person on the basis of a blinking analysis.

The method comprises a step of determining an average eye-opening measure of an open eye of the driver, wherein the eye-opening measure corresponds to a distance between an upper and a lower eyelid of the eye.

The average eye-opening measure in the case of open eyes can also be designated as the normal opening. To determine the normal opening, the eye-opening measure can be observed over a certain period of time, wherein multiple blinking processes take place in this period of time. During a blinking process, a closing movement first takes place, during which the eye-opening measure decreases, and then an opening movement of the eye, in which the eye-opening measure increases. In a period of time between the individual blinking processes, the eye is open and the eye-opening measure varies around a value which corresponds to the average eye-opening measure in the case of open eyes. To determine the average eye-opening measure in the case of open eyes, therefore only the periods of time are taken into consideration in which the eye is open, i.e., the periods of time between the individual blinking processes. Specifically, this can mean that the blinking processes are filtered out of the measurement data of the eye measure and the average eye-opening measure in the case of open eyes is calculated based on the remaining measurement data. The blinking processes can be filtered out from the measurement data, for example, based on a slope of a curve of the eye-opening measure over time.

The method furthermore comprises a step of determining a lower and upper limiting value, wherein the lower and the upper limiting value each correspond to an eye-opening measure which is less than the determined average eye-opening measure of the open eye. It is conceivable that the lower and upper limiting value are each determined by multiplication of the determined average eye-opening measure of the open eye (or the normal opening) by a predetermined percentage. The lower limiting value is less than the upper limiting value.

The method furthermore comprises a step of determining an average duration of an opening process of the eye of the driver, wherein the eye-opening measure is between the lower and upper limiting value during the opening process. That is to say, to determine the duration of the eye-opening process, the eye-opening measure can be detected and a time span or duration per blink can be determined based thereon, in which the eye-opening measure is between the lower and upper limiting value. This time span can be determined for multiple blinks. The average duration, during which the eye-opening measure is between the lower and upper limiting value, can be determined by addition of the duration per blink of the multiple blinks divided by the number of the multiple blinks, in order to obtain the average opening duration.

The method furthermore comprises a step of determining the drowsiness of the driver based on the determined average duration of the opening process. It is conceivable that the drowsiness of the driver is proportional to an average duration of the opening process.

The determination of the average eye-opening measure of the open eye or the normal opening can take place during a first predetermined period of time and the determination of the average duration of the opening process can take place during a second predetermined period of time following the first predetermined period of time.

During the opening process, the eye-opening measure, which is between the lower and upper limiting value, can become greater. That is to say, in the determination of the average duration of the opening process, only or exclusively times during the opening of the eye can be taken into consideration, since the distance between the lower and upper eyelid only increases here (this distance becomes less during the closing process of the eye).

The determination of the average eye-opening measure of the open eye (or the normal opening) and/or the eye-opening measure for determining the average duration of the opening process can be carried out by means of a camera system. That is to say, a camera can be provided which is aligned so that it detects the eye of the driver. Based on image data detected by the camera, in particular continuously, the eye-opening measure can be determined, in particular by means of a computing unit connected to the camera.

The determination of the drowsiness of the driver can be carried out by an assignment of the average time of the eye-opening process to predetermined discrete drowsiness levels and/or to a drowsiness percentage scale. It is conceivable, for example, that the assignment is carried out based on historical data stored in a database. It can thus be determined beforehand in the scope of a study, for example, at which drowsiness level of the Karolinska drowsiness scale drivers are to be classified upon the presence of which average duration of the opening process, so that then upon use of the method in the motor vehicle, the assignment can take place based on the data obtained by means of the study.

The method can furthermore comprise an output of a control signal to the motor vehicle depending on the determined drowsiness of the driver. It is conceivable, for example, that the travel velocity of a motor vehicle is limited by means of the control signal and/or the driver is given an alarm with respect to his drowsiness status if a predetermined drowsiness limiting value is exceeded. It is also conceivable, additionally or alternatively, to prevent activation of automated driving if a predetermined drowsiness limiting value is exceeded.

The description above can be summarized as described hereinafter in other words for a specific embodiment. It is conceivable that by means of a camera or an alternative system for high-frequency detection of an eye-opening measure of a driver, an average eye-opening measure with open eyes or a normal opening of the eye of the driver is determined. The average eye-opening measure of an open or opened eye can be defined as the average distance (for example in millimeters) between the upper and the lower eyelid between blinks taking place in a specific time interval.

Based on the determined eye-opening measure, a calculation of the normal opening of the eye for a time interval T1 (for example, the last 20 seconds) can be carried out by filtering out the eye-opening measure during the respective blinks. The normal opening can thus comprise a calculation of an average of the eye-opening measure after the exclusion of the blinking processes from the measurement data. The normal opening can be used as a reference for the calculation of the normalized eye-opening time (for example, 100% or 1.0).

The calculation of the normalized eye-opening time can correspond to a time or a time interval in which the eye-opening measure, after reaching the minimum point (i.e., after the closing of the eye), varies between a low reference point P1, for example 20% or 0.2 of the normal opening, and a higher reference point, for example 80% or 0.8 of the normal opening. Based thereon, a calculation of an average of the normalized eye-opening times in a time interval T2 (for example, during the blinking processes within the last 90 seconds) can be carried out.

To determine the drowsiness, a correlation can now be carried out of the average time of the eye opening process to specific discrete drowsiness levels (for example, 0.1 seconds—0.3 seconds awake, 0.3-0.5 slightly drowsy, 0.5-0.7 seconds drowsy, 0.7 . . . sleepy), to the Karolinska drowsiness scale (0.1-0.2 seconds—level 1; 0.2-0.3—level 2, . . . greater than 1.0—level 10), or to a drowsiness percentage scale (e.g., 0.1 seconds—0% drowsy, 1.3 seconds or higher—100% drowsy).

Furthermore, a control unit for a motor vehicle, in particular an automated motor vehicle, is provided, wherein the control unit is designed to at least partially carry out the above-described method.

The description above with reference to the method also applies analogously to the control unit and vice versa. An embodiment is described hereinafter with reference to FIGS. 1 to 3.

DETAILED DESCRIPTION OF THE DRAWINGS

Figure 1:
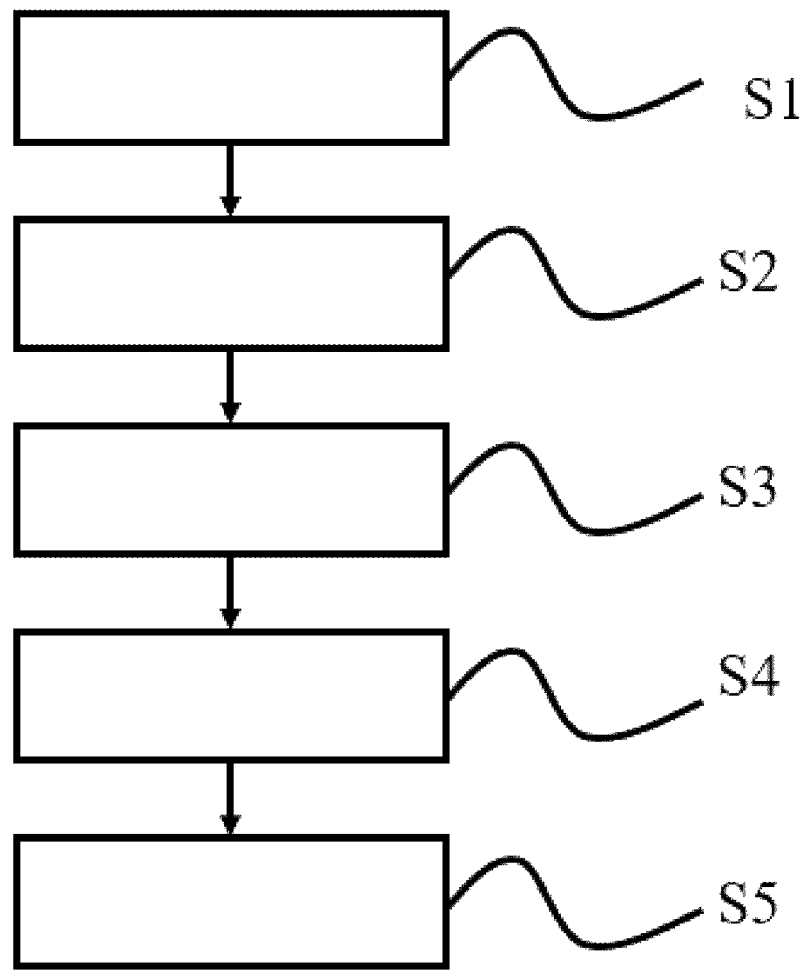
FIG. 1 schematically shows a flow chart of a method for determining the drowsiness of a driver of a motor vehicle.

As can be seen from FIG. 1, the method for determining the drowsiness of a driver of a motor vehicle essentially includes five steps S1-S5.

The method can be carried out by a control unit (not shown), which is installed, for example, in an automated automobile. For this purpose, the control unit can include a computing unit and can be connected to a (video) camera, which is directed into the vehicle interior and designed so that it detects an eye of the driver.

The method is based on an analysis of a curve of an eye-opening measure a during a blink of the driver, which can also be designated as a blinking process. The eye-opening measure a corresponds to a distance between an upper and a lower eyelid of the eye.

Figure 2:
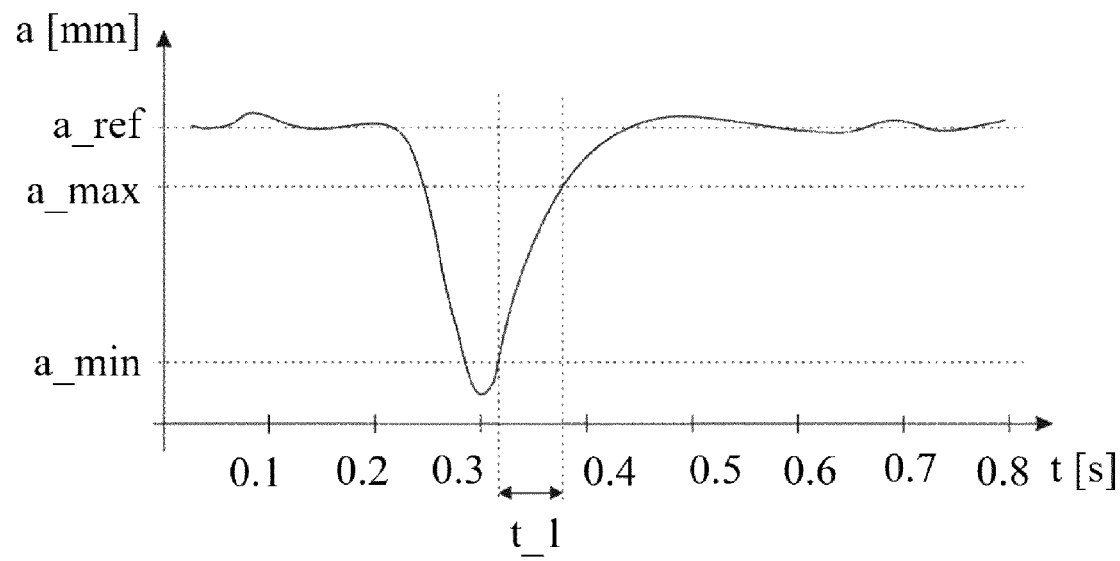
FIG. 2 schematically shows a curve of an eye opening measure during a blink in the case of a non-drowsy driver.
Figure 3:
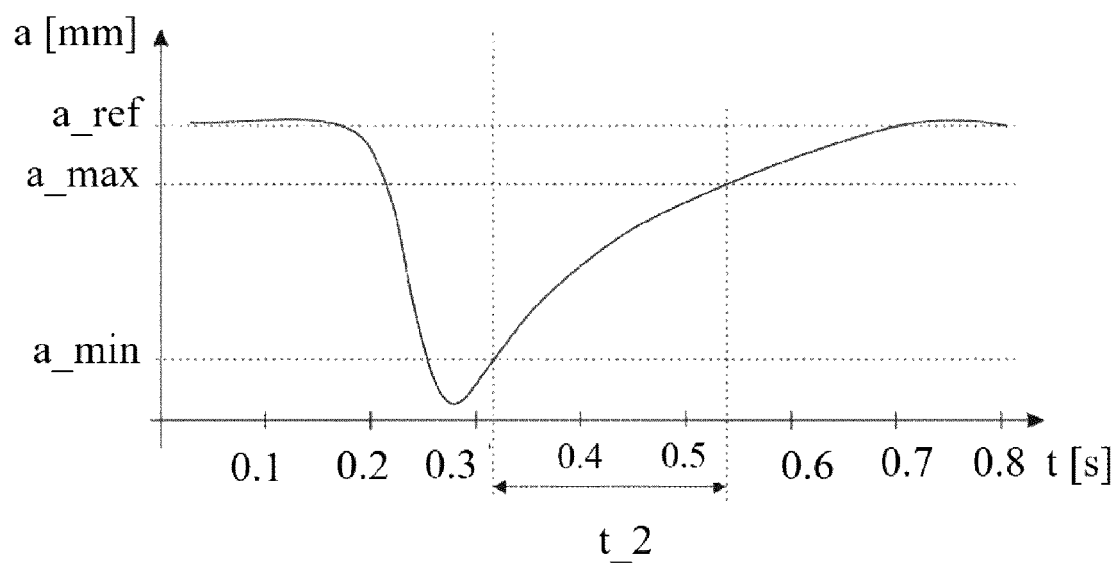
FIG. 3 schematically shows a curve of an eye-opening measure during a blink in the case of a drowsy driver.

In FIG. 2, such a curve of the eye-opening measure a (vertical axis) over a time t (horizontal axis) is shown by way of example for a non-drowsy driver and is shown in FIG. 3 for a drowsy driver, in each case for one blink.

In a first step S1 of the method, initially an average eye-opening measure a_ref of the open eye of the driver in a given time interval is determined.

In a second step S2 of the method, a determination of a lower limiting value a_min and an upper limiting value a_max (see FIGS. 2 and 3) takes place, wherein the lower and the upper limiting value a_min, a_max each correspond to an eye-opening measure a which is less than the determined average eye-opening measure a_ref.

The lower limiting value a_min can correspond, for example, to 20% of the average eye-opening measure a_ref and the upper limiting value a_max can correspond, for example, to 80% of the average eye-opening measure a_ref.

In a third step S3 of the method, a determination of an average duration of an opening process of the eye of the driver takes place, wherein for this purpose exclusively the duration t1, t2 is taken into consideration, during which the eye-opening measure a is between the lower and upper limiting value a_min, a_max and becomes greater at the same time.

As is apparent from a consideration of FIGS. 2 and 3 together, the duration t2 of the opening process in the case of a drowsy driver increases in comparison to the duration t1 in the case of a non-drowsy driver here, i.e., the opening process takes longer in the case of a drowsy driver than in the case of a non-drowsy or awake driver.

In a fourth step S4 of the method, a determination of the drowsiness of the driver is then carried out based on the determined average duration of the opening process. More precisely, the determination of the drowsiness of the driver is carried out by an assignment of the average time of the eye-opening process to specific discrete drowsiness levels, in particular of the Karolinska drowsiness scale, and/or to a drowsiness percentage scale.

The method can furthermore comprise an optional fifth step S5, in which a control signal is output by the control unit to the motor vehicle depending on the determined drowsiness of the driver.

The determination of the average maximum eye-opening measure a_ref in the first step S1 can take place over a first period of time and the determination of the average duration of the opening process of the eye of the driver in the third step S3 can take place over a second period of time, wherein the second period of time can follow the first period of time.

LIST OF REFERENCE SIGNS a eye opening measure in millimeters
a_ref average eye-opening measure of the open eye or normal opening
a_max upper limiting value
a_min lower limiting value
S1-S5 steps of the method
t time in seconds
t_1 duration of the opening process in the case of a non-drowsy driver
t_2 duration of the opening process in the case of a drowsy driver

The invention claimed is:

1. A method for determining the drowsiness of a driver of a motor vehicle, the method comprising:
   determining an average eye-opening measure of an open eye of the driver, wherein the eye-opening measure corresponds to a distance between an upper and a lower eyelid of the eye;
   determining a lower limiting value and an upper limiting value, wherein the lower and upper limiting value each correspond to an eye-opening measure that is less than the determined average eye-opening measure;
   determining an average duration of an opening process of the eye of the driver, wherein during the opening process the eye-opening measure is between the lower and the upper limiting value; and
   determining the drowsiness of the driver based on the determined average duration of the opening process.

2. The method according to claim 1, wherein the determination of the average eye-opening measure of the open eye takes place during a first predetermined period of time and the determination of the average duration of the opening process takes place during a second predetermined period of time following the first predetermined period of time.

3. The method according to claim 1, wherein, during the opening process, the eye-opening measure, which is between the lower and the upper limiting value, becomes greater.

4. The method according to claim 1, wherein the determination of the average eye-opening measure of the open eye and/or the determination of the eye-opening measure to determine the average duration of the opening process are carried out by means of a camera system.

5. The method according to claim 1, wherein the determination of the drowsiness of the driver is carried out by an assignment of the average duration of the opening process of the eye to specific discrete drowsiness levels, in particular of the Karolinska drowsiness scale, and/or to a drowsiness percentage scale.

6. The method according to claim 1, further comprising:
   outputting a control signal to the motor vehicle depending on the determined drowsiness of the driver.

7. A control unit for a motor vehicle, wherein the control unit is configured to carry out the method according to claim 1.

* * * * *